United States Patent
Yang (10) Patent No.: US 9,288,471 B1
(45) Date of Patent: Mar. 15, 2016

(54) ROTATABLE IMAGING ASSEMBLY FOR PROVIDING MULTIPLE FIELDS OF VIEW

(71) Applicant: Amazon Technologies, Inc., Reno, NV (US)

(72) Inventor: Jung Sik Yang, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 411 days.

(21) Appl. No.: 13/781,620

(22) Filed: Feb. 28, 2013

(51) Int. Cl.
*H04N 15/00* (2006.01)
*H04N 13/02* (2006.01)

(52) U.S. Cl.
CPC .................. *H04N 13/0221* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 5,497,188 | A * | 3/1996 | Kaye ................................ | 348/36 |
| 5,801,919 | A * | 9/1998 | Griencewic .............. | 361/679.26 |
| 6,347,290 | B1 * | 2/2002 | Bartlett .......................... | 702/150 |
| 6,507,665 | B1 * | 1/2003 | Cahill et al. .................... | 382/154 |
| 6,532,035 | B1 * | 3/2003 | Saari et al. .................. | 348/14.02 |
| 6,587,151 | B1 * | 7/2003 | Cipolla et al. ................. | 348/373 |
| 6,751,473 | B1 * | 6/2004 | Goyal et al. ................ | 455/556.1 |
| 6,933,981 | B1 * | 8/2005 | Kishida et al. ................. | 348/375 |
| 6,957,083 | B2 * | 10/2005 | Ikeda et al. ................. | 455/556.1 |
| 7,061,536 | B2 * | 6/2006 | Cha ................................. | 348/376 |
| 7,256,987 | B2 * | 8/2007 | Weng ....................... | 361/679.55 |
| 7,450,841 | B2 * | 11/2008 | Jung ............................. | 396/429 |
| 8,261,213 | B2 * | 9/2012 | Hinckley et al. .............. | 715/863 |
| 8,634,848 | B1 * | 1/2014 | Bozarth et al. ............. | 455/456.1 |
| 8,749,557 | B2 * | 6/2014 | Evertt et al. .................... | 345/473 |
| 8,760,395 | B2 * | 6/2014 | Kim et al. ...................... | 345/156 |
| 8,762,893 | B2 * | 6/2014 | Miller et al. .................. | 715/863 |
| 2009/0079700 | A1 * | 3/2009 | Abernathy .................... | 345/173 |
| 2010/0125816 | A1 * | 5/2010 | Bezos ........................... | 715/863 |
| 2012/0157200 | A1 * | 6/2012 | Scavezze et al. .............. | 463/31 |
| 2013/0286161 | A1 * | 10/2013 | Lv et al. .......................... | 348/46 |

\* cited by examiner

*Primary Examiner* — Dave Czekaj
*Assistant Examiner* — Leron Beck
(74) *Attorney, Agent, or Firm* — Novak Druce Connolly Bove + Quigg LLP (57) ABSTRACT

Various embodiments enable a first gesture to be detected from a user above a display screen of a computing device. The first gesture is detected using an imaging element of the computing device in a first position. In response to recognizing the first gesture, an input associated with the recognized first gesture is provided to an application executing thereon. The imaging element is movable and, depending on the application, can be moved to a second position. Accordingly, a second gesture is detected adjacent the computing device with the imaging element in the second position. In response to the recognized second object, a second input is provided to an appropriate application executing on the computing device.

20 Claims, 8 Drawing Sheets

FIG. 9

ROTATABLE IMAGING ASSEMBLY FOR PROVIDING MULTIPLE FIELDS OF VIEW

BACKGROUND

People are utilizing portable computing devices for an increasing number and variety of tasks in a variety of different settings. In some instances, users might want to capture information about products or people by using a camera of such a computing device. When the device is a smart phone or tablet computer that has a single stationary camera on the back of the device, for example, a user typically will have to hold the device "upright" between the user and the object for which an image is to be captured. While such usage might be sufficient for capturing single images, there are an increasing number of tasks that utilize captured image information where it can be less than desirable to have to hold the device in such an orientation. For example, many applications utilize 3D data, but it can be difficult to collect this data using a single camera that can analyze and collect data on an objects its shape, appearance (i.e. color), and motion. This 3D data is useful for a wide variety of applications such as, gaming, movies, virtual shopping, and the like. A single stationary camera, however, limits the camera's possible uses and applications. Therefore, as technology advances and as people are increasingly using portable computing devices in a wider variety of ways, it can be advantageous to not only adapt the ways in which imaging data is captured, but also the ways in which users utilize the same.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling a user to interact with a computing device and/or enabling a computing device to obtain information. In particular, various approaches enable a computing device to scan over a range of directions using a rotatable camera assembly. In at least some embodiments, the assembly can include a pair of cameras for capturing three-dimensional (3D) images over at least a portion of the range of directions, enabling functionality such as enhanced motion and gesture recognition. In one example, a portable computing device can include a camera system for capturing a video stream that can be analyzed for purposes such as facial recognition and full-body tracking. The camera system can be part of a rotatable assembly, enabling a user or application to adjust or choose a desired field of view. For example, a user can utilize the camera system in a front facing field of view mode (perpendicular to a display screen) to recognize gestures for unlocking functionality or providing a shortcut for an application command. In another example, the rotatable assembly can be rotated to enable the user to utilize the camera system in a side facing field of view mode (parallel to the display screen) to scan and recognize objects. In another example, a user can utilize the rotatable assembly in a back facing field of view mode (perpendicular to a display screen but facing away from the user) to capture images in a more conventional orientation. Thus, the rotatable assembly can rotated or be orientated to accommodate any angular variation (e.g. from an angle substantially perpendicular to a display screen 180 degrees to an angle substantially perpendicular to a back surface) relative to the computing device for a variety of tasks and while engaging in various activities that can be associated with different applications.

Further, the portable computing device may couple with other devices, such as a television, to facilitate gesture recognition and body tracking for a game being played by the user through the television or other device. For example, the portable computing device can couple with the television and be placed on a table for capturing and recognizing hand gestures above the device with the camera-based system in the front facing field of view mode. Recognized hand gestures, in this example, can be provided an input for a game being displayed on a television, such as a race car game where the motion of a user's hand above the device simulates the motion of steering a steering wheel. In another example, the portable computing device can couple with a television and be placed a distance from one or more users for capturing and recognizing hand, facial, or full body movement gestures in front of the device with the camera-based system in the side facing field of view mode. Recognized hand, facial, or full body movement gestures, in this example, can be provided as an input for a game, such as a dancing or bowling game, being displayed on the television.

In at least one embodiment, a first gesture can be detected from a user above a display screen of a portable computing device. The gesture can be a facial gesture, gesture made with one or more hands, or a whole body gesture, such as a jumping jack. The first gesture is detected using an imaging element of the portable computing device in a first position relative to the portable computing device. In response to recognizing the first gesture, an input associated with the recognized gesture can be provided to an application executing on the portable computing device. For example, the application could be a gaming application, a phone application where the gesture could be associated with speed dialing a contact in the user's contact, the application could be associated with unlocking the computing device from a locked-screen state, and the like. Depending on the desired application, the imaging element is movable and can be positioned such that the field of view is perpendicular or parallel to the display screen or any other angular orientation as desired by the user. In this example, a second gesture is detected adjacent the computing device with the imaging element in a second position (i.e. with the imaging element facing a direction parallel to the display screen) relative to the portable computing device. In response to the second object adjacent the computing device being recognized, a second input can be provided to an appropriate application executing on the portable computing device, which can be the same application associated with the first input or a different application.

Various other functions and advantages are described and suggested below as may be provided in accordance with the various embodiments.

FIGS. 1A-1D each illustrate a different example orientation of a rotatable camera assembly 106 of a computing device 102 enabling rotation of an imaging 108, such as a digital camera and/or other imaging element(s)/sensor(s), relative to a housing or body of the computing device 102. Although a smart phone is shown, it should be understood that various other types of electronic or computing devices that are capable of determining and processing input can be used in accordance with various embodiments discussed herein. These devices can include, for example, notebook computers, desktop computers, tablet computers, personal data assistants, electronic book readers, video gaming consoles or controllers, televisions or smart televisions, and portable media players, among others. In this example, the rotatable camera assembly 106 is movable about a couple of hinge or rotation points 110 for enabling changes in the direction that an imaging element 108 is facing. The camera assembly 106 can be rotated manually by the user, mechanically by a motor component 114 in response to a command given to the computing device 102 by the user 212, or the camera assembly 106 may rotate automatically when a certain application is opened.

Figure 1A:
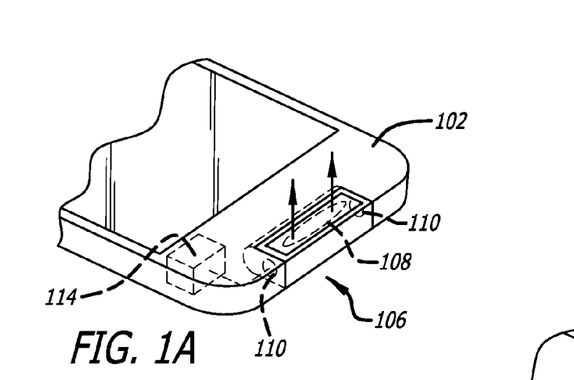
FIGS. 1A-1D illustrate example orientations of an imaging element of computing device in accordance with at least one embodiment.
Figure 1B:
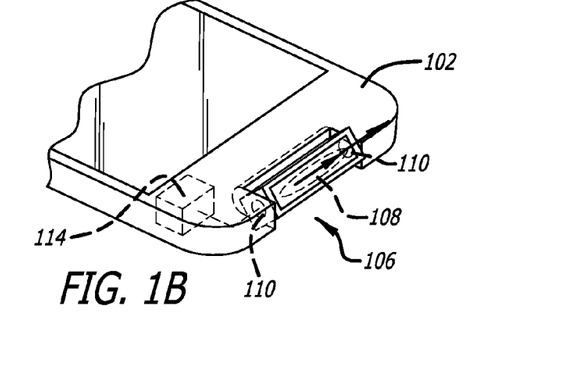
Figure 1C:
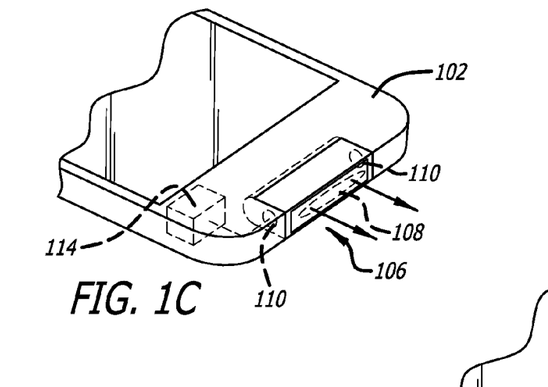
Figure 1D:
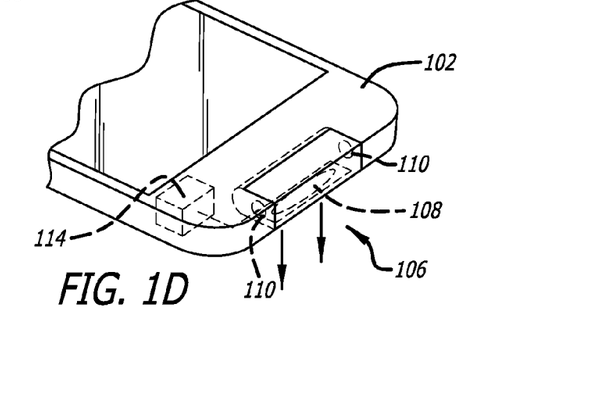

FIG. 1A illustrates the computing device 102 with the camera assembly 106 in a user-facing orientation. In this example, the camera assembly 106 is orientated such that the camera 108 will be facing a user (perpendicular to the display screen) holding the computing device 102. In this example, a user could utilize the orientation of FIG. 1A to video chat with another user, provide facial input to the computing device 102, and the like. FIG. 1B illustrates the computing device 102 with the camera assembly 106 in a 45 degree angle pointed away from the device. A use could make use of the camera 108 in this orientation to video chat or video conferencing with another user or users a distance from the user, such as if the computing device 102 wrer placed on a table while the other user was performing some other task, sitting in a chair, or writing on a chalk or white board. Many other applications and uses are also possible with the camera assembly 106 in a 45 degree angle relative to either the front or back of the computing device 102. FIG. 1C illustrates the computing device 102 with the camera assembly 106 in a straight orientation where the camera 108 is pointed away from the computing device 102, parallel to the display screen. In this orientation, the computing device 102 could be utilized as a motion or tracking sensor for a user playing a game a distance away from the device. FIG. 1D illustrates the computing device 102 with the camera assembly 106 in a perpendicular orientation where the camera 108 is pointed away from a user, such that the user can view a substantially live image of a field of view of the camera 108 on the display screen when holding the device. In this orientation, the camera 108 can be used to capture still or video images while the user is holding the device. Although FIGS. 1A-1D illustrate four example angular orientations of the rotatable camera assembly 106, it should be understood that the camera assembly 106 can be orientated at any angle in between those illustrated and may also capture still or video images while the camera assembly 106 is moving or rotating from one angle of orientation to another. Various other types of imaging sensor orientations and applications can be utilized and provided as well within the scope of the various embodiments.

Figure 2:
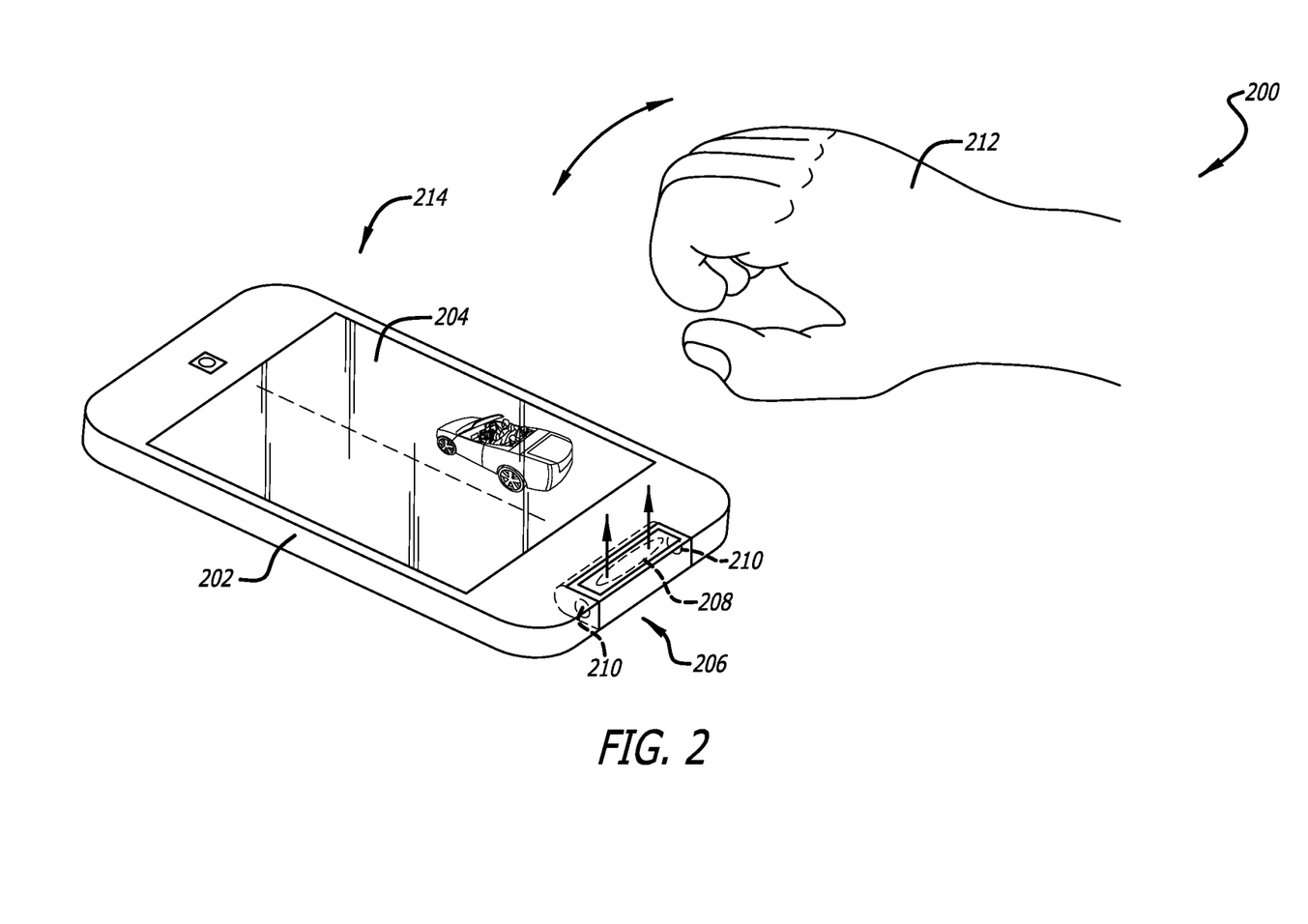
FIG. 2 illustrates an example implementation of an imaging element of computing device being used in one possible position in accordance with at least one embodiment.

FIG. 2 illustrates an example use case 200 where a user 212 is interacting with a portable computing device 202 in the user-facing mode in accordance with at least one embodiment. In this example, the computing device 202 includes a rotatable camera assembly 206 for enabling rotation of a camera and/or other imaging element relative to the housing or body of the computing device 202, as described above. In this example, the rotatable camera assembly 206 is movable about a couple of hinge or rotation points 210 for enabling changes in the direction that an imaging element 208 (i.e. camera and/or other sensors) is facing. The camera assembly 206 is rotatable manually by the user, mechanically by a motor component in response to a command from the user 212, or automatically rotatable when certain applications are opened or conditions are recognized that actuate the motor component as discussed above.

In the example use case 200, the camera assembly 206 is in a front facing field of view mode (perpendicular to a display screen 204) and the user 212 is playing a car driving game while looking substantially downward 214 on the display screen 204. In this example, movement of user's hand, which is simulating holding a steering wheel, is recognized and tracked by the imaging element 208 and the movement is interpreted and converted into control signals for moving the car on the display screen 204. Further, in this front facing field of view mode, the computing device 202 can recognize gestures for unlocking functionality, such as unlocking a device from a locked-screen state, or provide a shortcut for an application command, such as speed dialing a number in a user's address book, opening a particular application, and the like.

In at least one embodiment, the camera is an RGB camera that can deliver a three-color (Red, Green, Blue) video stream. The camera assembly can also include a 3D depth sensor with an infrared projector. The 3D depth sensor can use structured light to infer depths by projecting a known pattern of light onto an object and determining the various depths of the object based at least on how the known pattern is projected on a surface of the object. The camera and sensor can also use depth from focus, which is based on the assumption that blurrier objects are farther away than less blurry objects, and depth from stereo. Various recognition and tracking algorithms can utilize this and other sensor data to recognize objects, facial expressions, motion or hand gestures, or full-body movements and provide the same as inputs to an application executing on the portable computing device. A wide variety of technologies other than Structured Light may also be utilized, such as Time of Flight range imaging camera system, triangulation technologies, stereoscopic imaging technologies, and any other sensor or detection system that can support 3D scanning and motion gesture recognition. Various other types of sensors, data, algorithms, or techniques can be utilized and provided as well within the scope of the various embodiments.

Figure 3:
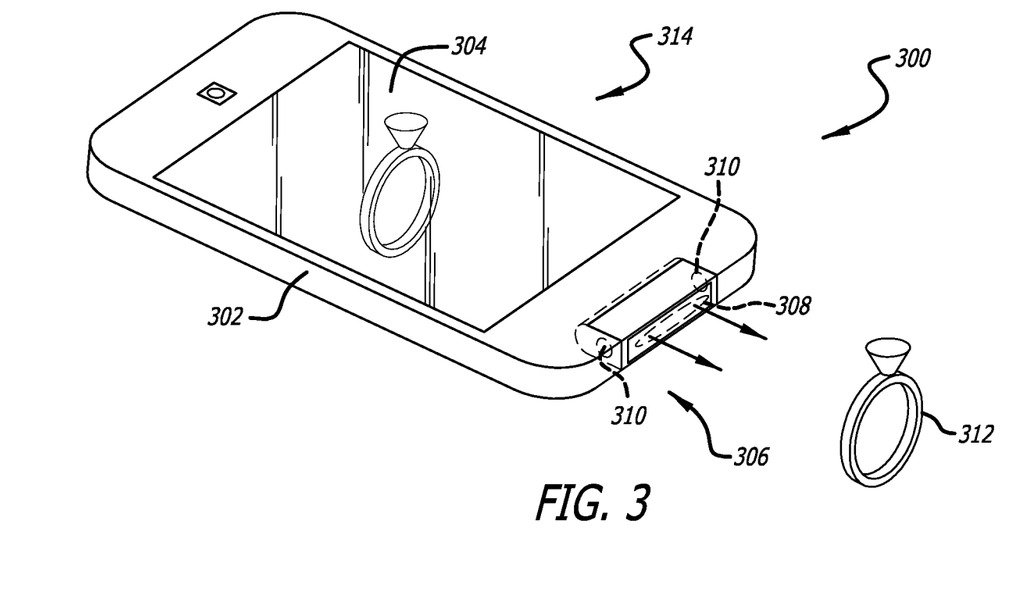
FIG. 3 illustrates an example implementation of an imaging element of computing device being used in another possible position in accordance with at least one embodiment.

FIG. 3 illustrates another example use case 300 for recognizing an object 312 with a portable computing device 302 in accordance with at least one embodiment. Through the reference numbers are different, the computing device 302 could be the same or different computing device 202 described above with respect to FIG. 2. In this example, the computing device 302 also has a rotatable camera assembly 306 movable about two hinge or rotation or pivot points 310 for enabling changes in the direction of an imaging element 308. In this example, the camera assembly 306 is in a side facing field of view mode (parallel to a display screen 304). In one example, the side facing field of view mode can be utilized to recognize objects for a variety of purposes. For example, a user could scan an object to perform a visual search for an item on a website of an electronic marketplace or online retailer. A user shopping in a store, could see an object 312, and be interested in comparing the price of the object 312 to either the same object or similar objects available through the electronic marketplace or learn more about the object 312. In one example, the user could point the imaging element 308 at the object 312 and various recognition and/or tracking algorithms can match feature points of the object 312 against a plurality of training images stored for items available through the electronic marketplace or elsewhere. Having the camera assembly 306 in the side facing field of view mode would give the user more natural usability during the 3D scanning process, rather than having the camera at the front or back of computing device 302. In one implementation, this mode enables a user to scan any type of the external object while watching what is being scanned on the display screen 304 of computing device 302.

Figure 4:
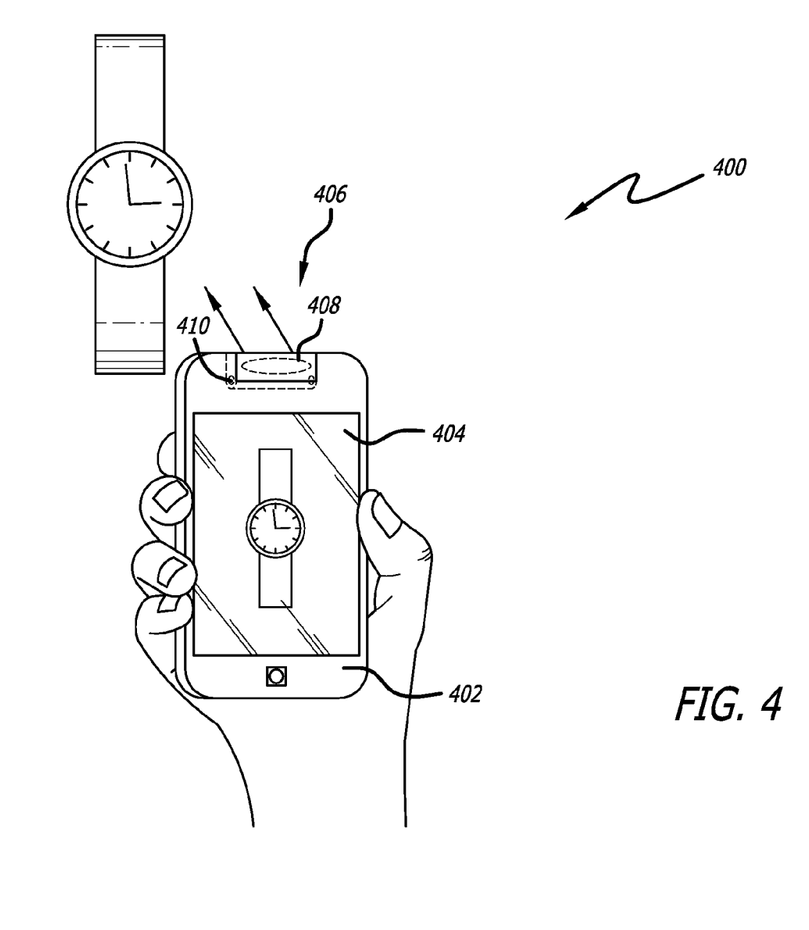
FIG. 4 illustrates another example implementation of an imaging element of computing device being used in accordance with at least one embodiment.

Similar to FIG. 3, FIG. 4 illustrates another example use case 400 for viewing and/or recognizing an object, such as a watch, in this example, with a portable computing device 402 in accordance with at least one embodiment. In this example, the computing device 402 includes a rotatable camera assembly 406 movable about the two hinge or rotation points 410 for enabling changes in the direction of the imaging element 408. In this example, the camera assembly 406 is in an orientation facing away from the user such that the user can view the object as a substantially live image on the display screen 404. As mentioned above, such an away facing field of view mode can be utilized to recognize objects for a variety of purposes, such as scanning objects to perform a visual search for an item on a website of an electronic marketplace or online retailor. In at least one example, the away facing field of view mode can enable a user to scan any object and watch what is being scanned on the display screen 404 as the user holds the computing device 402 in a natural position in front of them. For example, the user can hold the computing device 402 in their right hand while scanning their left hand to virtually try on a watch to see how the watch would look on their hand without actually trying the watch on. Various other types applications and imagining element/sensor orientations can be utilized and provided as well within the scope of the various embodiments.

Figure 5:
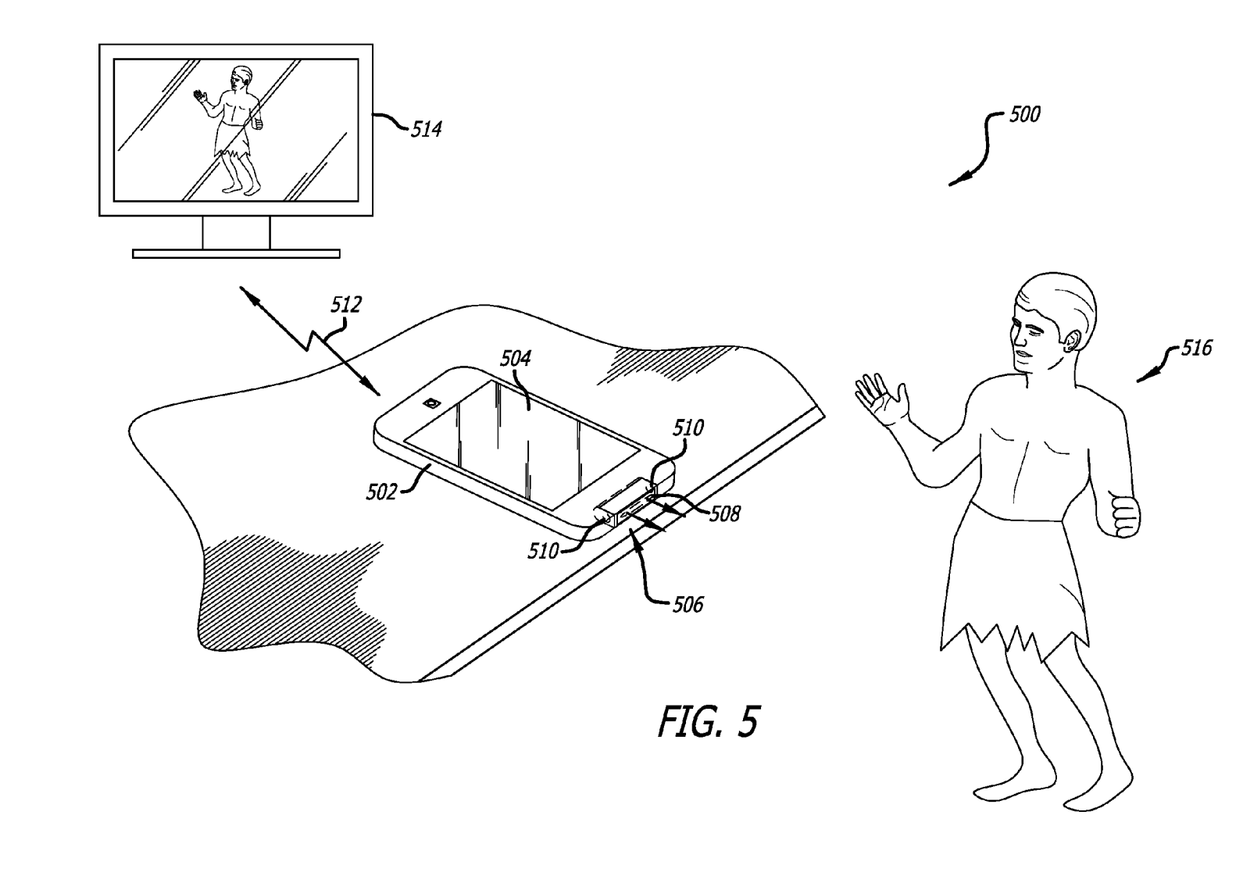
FIG. 5 illustrates another example implementation of an imaging element of computing device being used in accordance with at least one embodiment.

FIG. 5 illustrates another example use case 500 for recognizing and tracking gestures from one or more users 516 with a portable computing device 502 coupled to an external device 514 in accordance with at least one embodiment. Once again, though the reference numbers are different, the computing device 502 could be the same or different device as computing device 202 or 302 described above with respect to FIGS. 2-3. In this example, the computing device 502 also includes a rotatable camera assembly 506 movable about two hinge or rotation or pivot points 510 for enabling changes in the direction of an imaging element 508. In this example, the camera assembly 506 is in a side facing field of view mode (parallel to the display screen 504) and positioned a distance from the user 516 in order to track and recognize whole body motions and gestures. Accordingly, the computing device 502 can wirelessly (or wired) couple 512 with an external device, such as a television, game console, desktop, laptop, or tablet computer, or smartphone to facilitate playing a game where body movement or motion gestures are provided as game commands. In at least some embodiments, as described elsewhere herein, the imaging element 508 includes the ability to recognize objects in 3D instead of forcing a game console, for example, to parse a two-dimensional video stream. In the example of use case 500, the user is playing a dance game where, for example, the user is rewarded for mimicking or properly following an example provided by the game. In this example, the portable computing device 502 tracks and recognizes the dance movements and/or associated gestures of the user and provides the same as control inputs/signals to a game executing either on the computing device 502 itself or a separate gaming device that the computing device 502 is coupled to.

Figure 6:
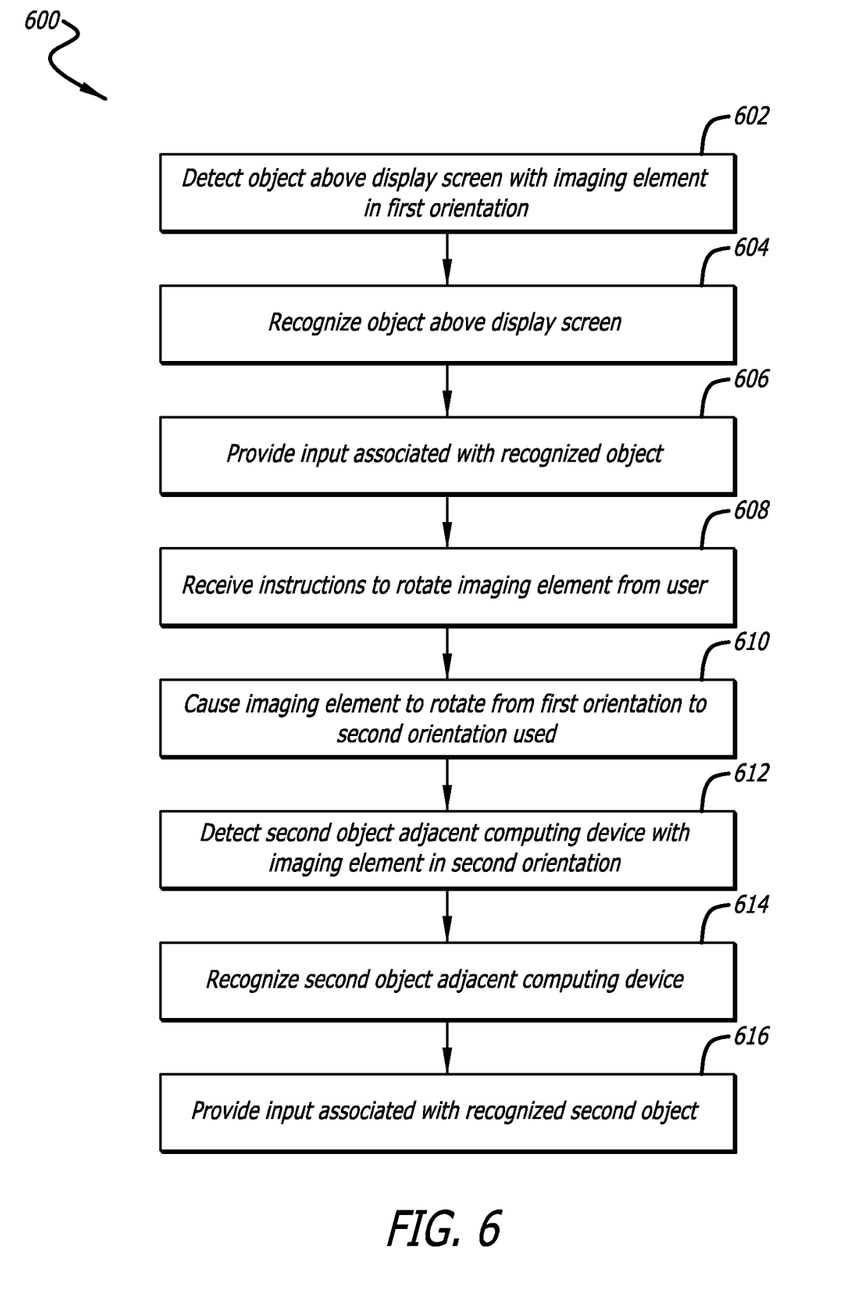
FIG. 6 illustrates an example process for that can be used in accordance with at least one embodiment.

FIG. 6 illustrates an example process 600 for recognizing and tracking objects from a user in accordance with various embodiments. It should be understood that, for this and other processes discussed herein, there can be additional, fewer, or alternative steps, performed in similar or alternative steps, or in parallel, within the scope of the various embodiments unless otherwise stated. In one example, a first object is detected 602 from a user above a display screen of a portable computing device. The object, in at least some embodiments is a gesture made or provided by a user including a whole body motion. The first object is detected using an imaging element of the portable computing device in a first position relative to the portable computing device. In this example, the first object made by the user above the display screen is recognized 604. In response to recognizing the first object, a first input associated with the recognized object is provided 606 to an application executing on the portable computing device. In this example, instructions from a user, application, or other source are received 608 to rotate the imaging element to change the field of view. Alternatively, the user could manually change or rotate the imaging element to change the field of view. In this example, in response to receiving instructions, the imaging element is rotated 610 from the first position where the imaging element is pointing upward to a second position relative to the portable computing device where the imaging element is pointing downward. Depending on the desired application, the imaging element could be positioned such that the field of view is perpendicular or parallel to the display screen. In this example, a second object is detected 612 adjacent the computing device with the imaging element in a second position (i.e. with the imaging element facing a direction parallel to the display screen) relative to the portable computing device. Further, the imaging element in different locations can capture different portions of the same object, and in some situations, can capture image data while rotating. In this example, the second object adjacent the computing device is recognized 614 and a second input associated with the recognized second object is provided 616 to an appropriate application executing on the portable computing device, which can be the same application associated with the first input or a different application. Various other types of imaging sensor orientations and applications can be utilized and provided as well within the scope of the various embodiments.

In at least one embodiment, for a pair cameras with at least partially overlapping fields of view, stereoscopic imaging can be performed by capturing image information for one or more objects from two different perspectives or points of view, and combining the information to produce a 3D image. In at least some embodiments, the fields of view can be matched through careful placement and calibration, as well as by manipulating the focal lengths for each camera as discussed elsewhere herein. Methods for producing a 3D image using image information from different perspectives are well known in the art and will not be described in detail herein. Example approaches include calculating an amount of disparity through a process such as edge matching, color matching, and/or texture matching, and combining the disparity information with color information from each perspective to generate a stereoscopic image, either before or at a time of display. For example, if the image information is matched then the image information can be combined and/or displayed directly on a 3D-capable display, wherein the human brain can effectively do at least some of the 3D processing. In other examples, the image information can be otherwise combined or processed at the time of display such that upon displaying the information a 3D image is generated.

In one embodiment, two different types of camera can be used to provide for stereo imaging. The first camera can be a relatively large, high resolution camera with a first aperture, with the second camera being a smaller camera having a lower resolution and a different aperture size. In at least some embodiments, the resolution and/or effective pixel size of the larger camera can be adjusted in order to better match the information in the lower resolution image. In order to compensate for different depths of focus for each camera, an appropriate aperture can be determined in order to have a similar depth of focus for each camera. Aperture sizes can be calculated that typically result in a larger aperture on the smaller camera than for conventional cameras of that size and/or resolution, as well as a potentially smaller aperture for the larger camera than for conventional cameras of that type on other electronic devices. By balancing the depths of focus, the image information can be combined in a way that will not generate significant false contours in the resulting 3D image information.

In another embodiment, an enhanced depth of focus technique can be used to address differences in depth of focus without requiring an expensive auto-focusing camera. In at least some embodiments, a custom lens can be utilized for at least one of the cameras of different types in order to focus different wavelengths (e.g., red (R), green (G), and blue (B)) in different locations. By analyzing captured image information for different wavelengths or wavelength ranges (e.g., each of the RGB components) for various portions of the image, the wavelength that is most in focus for each of those portions can be selected to provide the detail, and the other wavelengths then can be added in to provide appropriate color data. Such an approach enables auto-focusing to be done algorithmically, instead of mechanically using a motorized focusing mechanism.

In yet another embodiment, three (or more) cameras can be used to provide stereo imaging. In this embodiment, a pair of relatively low resolution cameras can be used to capture the three-dimensional position and/or disparity mapping data. A third, higher resolution camera can be used to capture higher resolution or more detailed image information. The image information captured by the lower resolution cameras (that can be implicitly matched) can be used to provide the disparity mapping data for 3D (i.e., generate a z-map), with the image data from the higher resolution camera being used to overlay color and intensity data. Such an approach effectively enables a low-resolution 3D map to be generated, which then can be painted using the image information from the higher resolution camera.

Figure 7A:
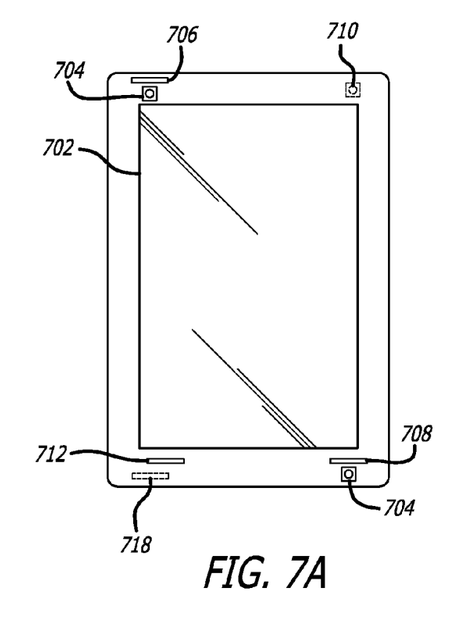
FIGS. 7A and 7B illustrate an example computing device that can be used to implement aspects of various embodiments.
Figure 7B:
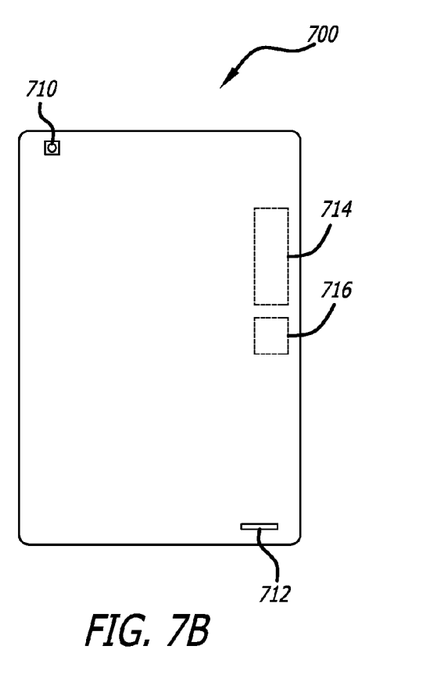

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
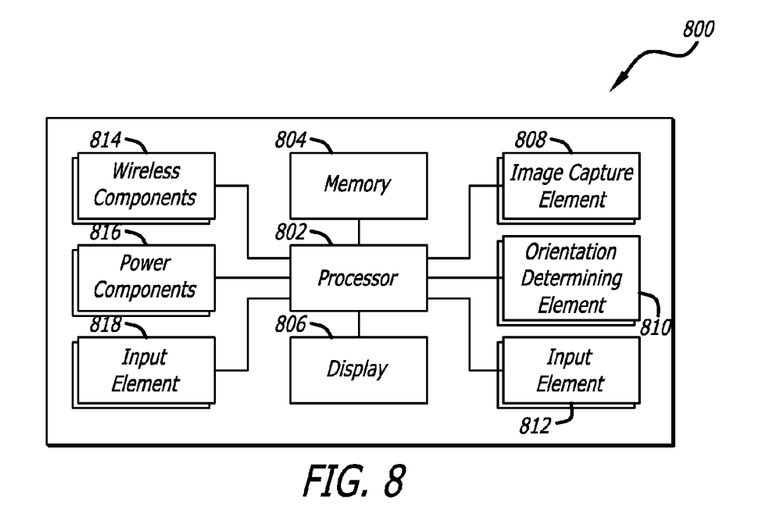
FIG. 8 illustrates example components that can be used with a device such as that illustrated in FIGS. 7A and 7B.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
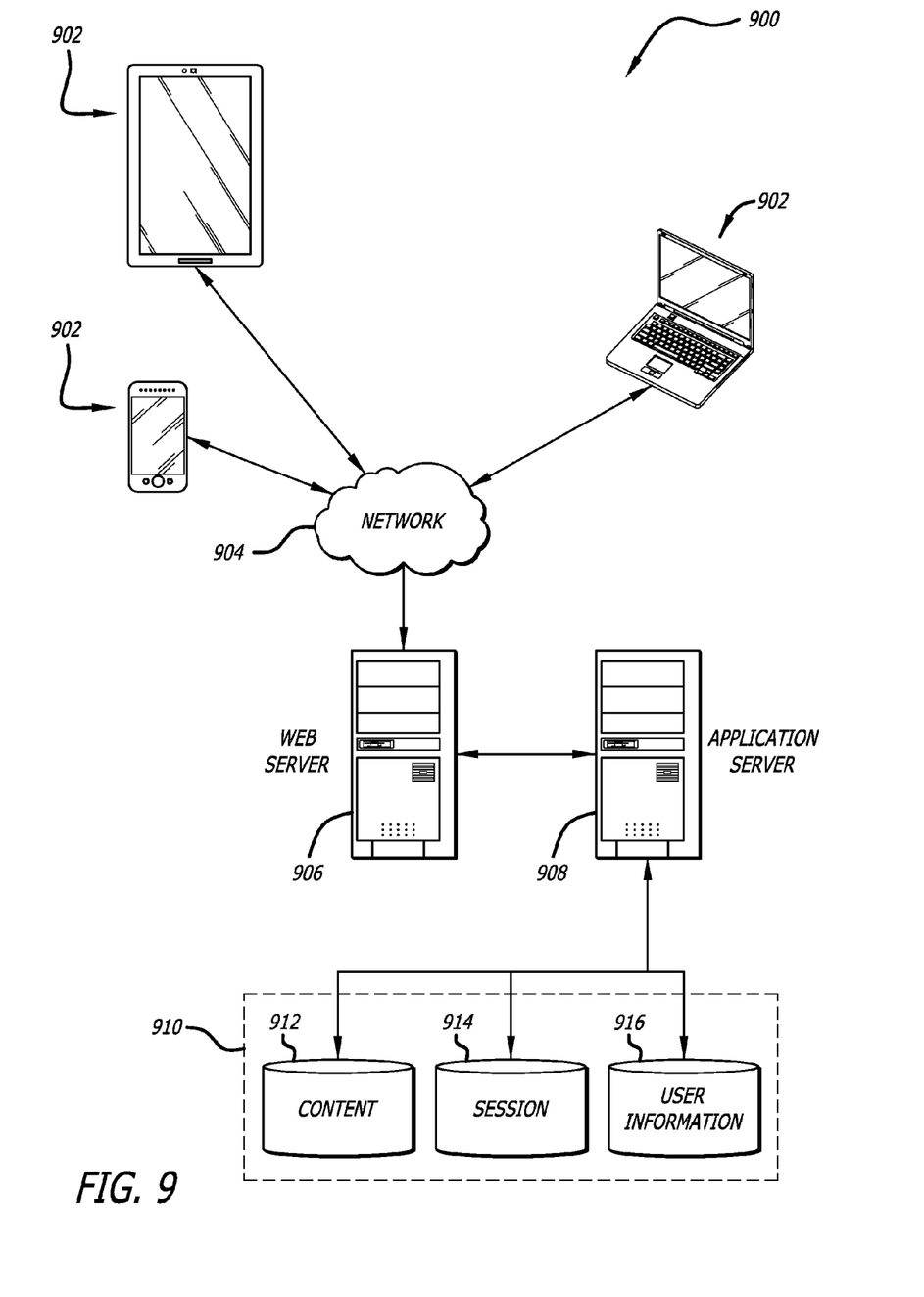
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under control of one or more computer systems configured with executable instructions,
capturing first image data using an imaging element of a computing device, the imaging element being in a first orientation such that a field of view of the imaging element faces a first side that is a same side as a viewable surface of a display screen of the computing device;
analyzing the first image data to recognize a first gesture;
providing a first input associated with the first gesture to a first application executing on the computing device;
capturing second image data using the imaging element in a second orientation such that the field of view of the imaging element faces a second side that is 90 degrees relative to the viewable surface of the display screen, the imaging element being rotated from the first orientation to the second orientation via an assembly of the computing device;
analyzing the second image data to recognize a second gesture; and
providing a second input associated with the second gesture to at least one of the first application or a second application executing on the computing device.

2. The computer-implemented method of claim 1, further comprising:
receiving one or more instructions from a user to rotate the imaging element to change a field of view of the imaging element; and
rotating the imaging element from the first orientation to the second orientation.

3. The computer-implemented method of claim 1, wherein the imaging element is a stereoscopic camera capable of capturing three-dimensional (3D) data in at least one of the first orientation or the second orientation.

4. The computer-implemented method of claim 1, further comprising:
capturing image data between a first time the imaging element is in the first orientation and a second time the imaging element is in the second orientation.

5. The computer-implemented method of claim 1, wherein the imaging element is manually movable by a user from the first orientation to the second orientation.

6. A portable computing device, comprising:
a processor;
an imaging element;
a display screen;
an assembly configured to rotate the imaging element; and
a memory including instructions that, when executed by the processor, cause the portable computing device to:
capture first image data using the imaging element in a first orientation such that a field of view of the imaging element faces a first side that is a same side as a viewable surface of the display screen;
analyze the first image data to identify at least one of a first object or a first gesture;
capture second image data using the imaging element in a second orientation such that the field of view of the imaging element faces a second side that is 90 degrees relative to the viewable surface of the display screen, the imaging element being rotated from the first orientation to the second orientation via the assembly; and
analyze the second image data to identify at least one of a second object or a second gesture.

7. The portable computing device of claim 6, wherein the assembly is further configured to rotate the imaging element to a third orientation such that the field of view of the imaging element faces a back surface of the portable computing device.

8. The portable computing device of claim 6, wherein the assembly includes a motor for rotating the imaging element between the first orientation and the second orientation.

9. The portable computing device of claim 6, further comprising:
a second imaging element,
wherein the portable computing device is capable of stereo image capture of objects in three dimensions via the imaging element and the second imaging element.

10. The portable computing device of claim 6, further comprising:
a depth sensor; and
an infrared projector,
wherein the portable computing device is capable of determining three dimensions of an object via the imaging element, the depth sensor, and the infrared projector.

11. The portable computing device of claim 6, wherein the instructions, when executed by the processor, further cause the portable computing device to:
receive one or more second instructions from a user to rotate the imaging element; and
rotate the imaging element from the first orientation to the second orientation via the assembly.

12. The portable computing device of claim 6, wherein the imaging element is manually movable via the assembly by a user from the first orientation to the second orientation.

13. The portable computing device of claim 6, wherein the instructions, when executed by the processor, further cause the portable computing device to:
capture image data between a first time the imaging element is in the first orientation and a second time the imaging element is in the second orientation.

14. The portable computing device of claim 6, wherein the imaging element is a stereoscopic camera capable of capturing three-dimensional (3D) data in at least one of the first orientation or the second orientation.

15. A non-transitory computer-readable storage medium storing instructions that, when executed by at least one processor of a computing device, cause the computing device to:
capture first image data using an imaging element of a computing device in first orientation such that a field of view of the imaging element faces a first side that is a same side as a viewable surface of a display screen; of the computing device;
analyze the first image data to identify at least one of a first object or a first gesture;
capture second image data using the imaging element in a second orientation such that the field of view of the imaging element faces a second side that is 90 degrees relative to the viewable surface of the display screen, the imaging element being rotated from the first orientation to the second orientation via an assembly of the computing device; and
analyze the second image data to identify at least one of a second object or a second gesture.

16. The non-transitory computer-readable storage medium of claim 15, wherein the imaging element is movable manually via the assembly by a user between the first orientation and the second orientation.

17. The non-transitory computer-readable storage medium of claim 15, wherein the computing device is capable of stereo image capture of at least one of an object or a gesture in three dimensions (3D).

18. The non-transitory computer-readable storage medium of claim 15, wherein the computing device includes a depth sensor and an infrared projector, and the computing device is capable of determining three dimensions of an object via the imaging element, the depth sensor, and the infrared projector.

19. The non-transitory computer-readable storage medium of claim 15, wherein the instructions, when executed by the at least one processor, further cause the computing device to:
receive one or more second instructions from a user to rotate the imaging element; and
rotate the imaging element from the first orientation to the second orientation.

20. The non-transitory computer-readable storage medium of claim 19, wherein the instructions, when executed by the at least one processor, further cause the computing device to:
capture image data while changing between a first time the imaging element is in the first orientation and a second time the imaging element is in the second orientation.

* * * * *